No. 836,687.

PATENTED NOV. 27, 1906.

F. A. JOHNSON.
TYPE SETTING AND JUSTIFYING MACHINE.
APPLICATION FILED OCT. 19, 1901.

Witnesses

Inventor
Frank Amos Johnson
By J. A. Watson
Atty

No. 836,687. PATENTED NOV. 27, 1906.
F. A. JOHNSON.
TYPE SETTING AND JUSTIFYING MACHINE.
APPLICATION FILED OCT. 19, 1901.

Witnesses
J. G. Hinkel
G. W. Clement.

Inventor
Frank Amos Johnson
By J. A. Watson atty.

No. 836,687. PATENTED NOV. 27, 1906.
F. A. JOHNSON.
TYPE SETTING AND JUSTIFYING MACHINE.
APPLICATION FILED OCT. 19, 1901.
10 SHEETS—SHEET 7.

No. 836,687. PATENTED NOV. 27, 1906.
F. A. JOHNSON.
TYPE SETTING AND JUSTIFYING MACHINE.
APPLICATION FILED OCT. 19, 1901.

Witnesses
J. G. Hinkel
C. W. Clement

Inventor
Frank Amos Johnson
By J. H. Watson
Atty

No. 836,687.

PATENTED NOV. 27, 1906.

F. A. JOHNSON.
TYPE SETTING AND JUSTIFYING MACHINE.
APPLICATION FILED OCT. 19, 1901.

Witnesses
J. G. Hinkel
E. W. Clement

Inventor
Frank Amos Johnson
By J. H. Watson, Atty

UNITED STATES PATENT OFFICE.

FRANK AMOS JOHNSON, OF NEW BEDFORD, MASSACHUSETTS, ASSIGNOR, BY MESNE ASSIGNMENTS, TO THE UNITYPE COMPANY, OF MANCHESTER, CONNECTICUT, A CORPORATION OF NEW JERSEY.

TYPE SETTING AND JUSTIFYING MACHINE.

No. 836,687.        Specification of Letters Patent.        Patented Nov. 27, 1906.

Application filed October 19, 1901. Serial No. 79,236.

*To all whom it may concern:*

Be it known that I, FRANK AMOS JOHNSON, a citizen of the United States, residing at New Bedford, in the county of Bristol and State of Massachusetts, have invented certain new and useful Improvements in Type Setting and Justifying Machines, of which the following is a specification.

The present invention comprises a machine for setting and justifying type. In this machine the type are arranged in magazines and ejected therefrom in the order desired by power-operated mechanism, the usual finger-keys being used simply to release or initiate the action of the ejecting mechanism. The type slide down an inclined apron onto a conveyer-belt which delivers them to a vertical assembling-channel. They are inserted at the bottom of the channel successively and held in compact form in the channel by a device which rests upon the end of the line, said device being automatically withdrawn when the line is ejected from the channel.

Temporary spaces or separators are inserted in the line and afterward ejected and final justifying-spaces introduced. In the present machine the justifying-spaces are cast from type-metal, which is a simple method of obtaining spaces of the exact size required and at the same time avoiding the trouble of distributing the spaces for future use. The mold in which the spaces are cast is adjusted by justifying mechanism comprising a device for measuring the unjustified line, devices for counting the word-spaces, and devices for dividing the shortage of the unjustified line by the number of spaces, the result being the thickness of the justifying-space required. After each line is assembled a "starting-key" is operated, which starts the justifying and respacing mechanism. The line is thereafter automatically justified and shifted into a galley.

The machine will be described in detail in the following specification, reference being had to the accompanying drawings, in which—

Fig. 25 is a front view, and Fig. 26 a side view, of a modified form of type-apron. Fig. 27 is a plan, Fig. 28 a front view, and Fig. 29 a side view of a modified construction, including a separator-magazine and devices for ejecting the separators and returning them to the magazine. Fig. 30 is a plan view, and Fig. 31 a side view, of a device for regulating the discharge of type from the assembling-belt to the elevator.

Figures 3, 4, 5, 6, 7:
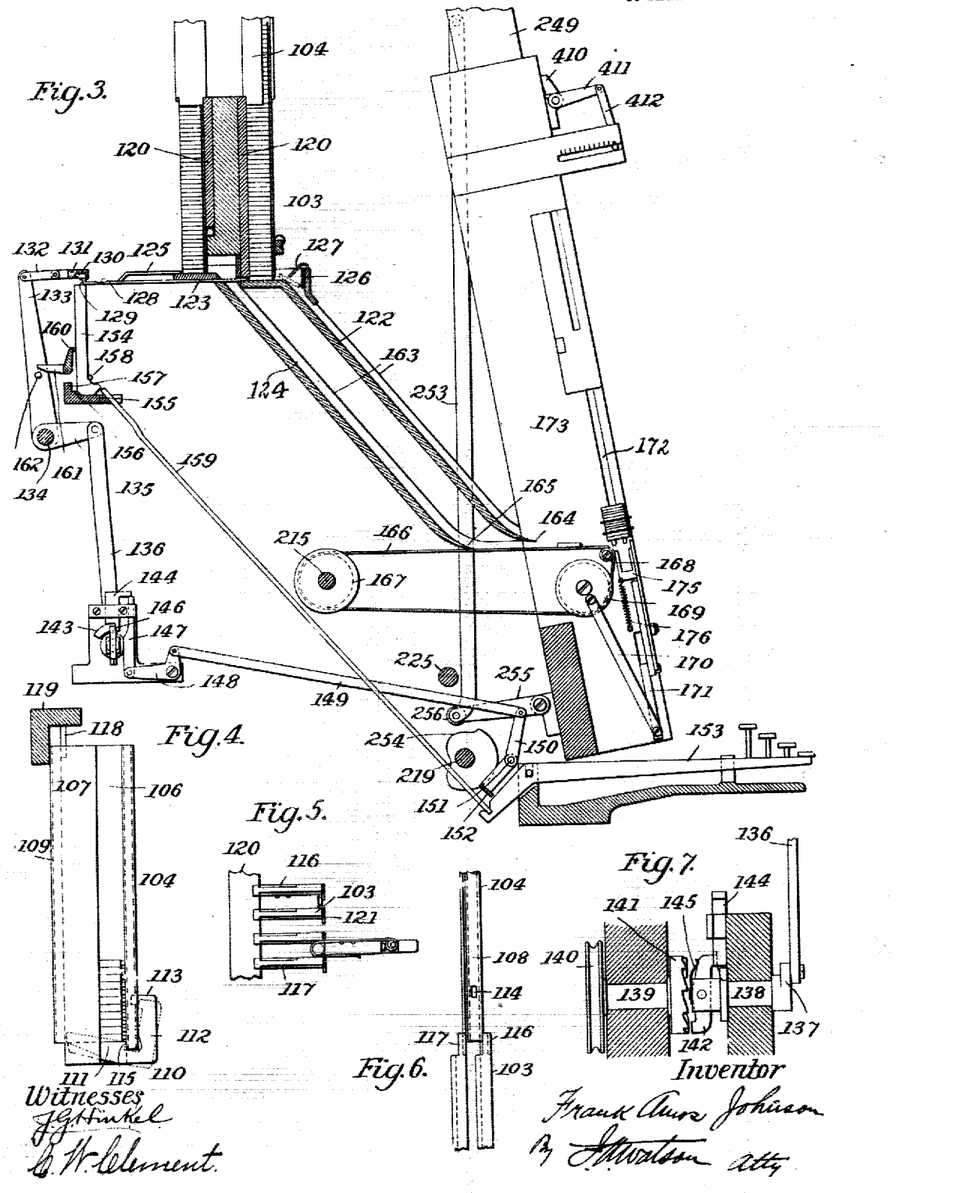
Fig. 3 is a section about on the line 3 3 of Fig. 2.
Fig. 4 is a side elevation of one of the removable type-channels.
Figs. 5 and 6 are details showing the manner of joining the portable type-channels to the magazines.
Fig. 7 is a detail of the escapement mechanism.
Figures 8, 9, 10, 11:
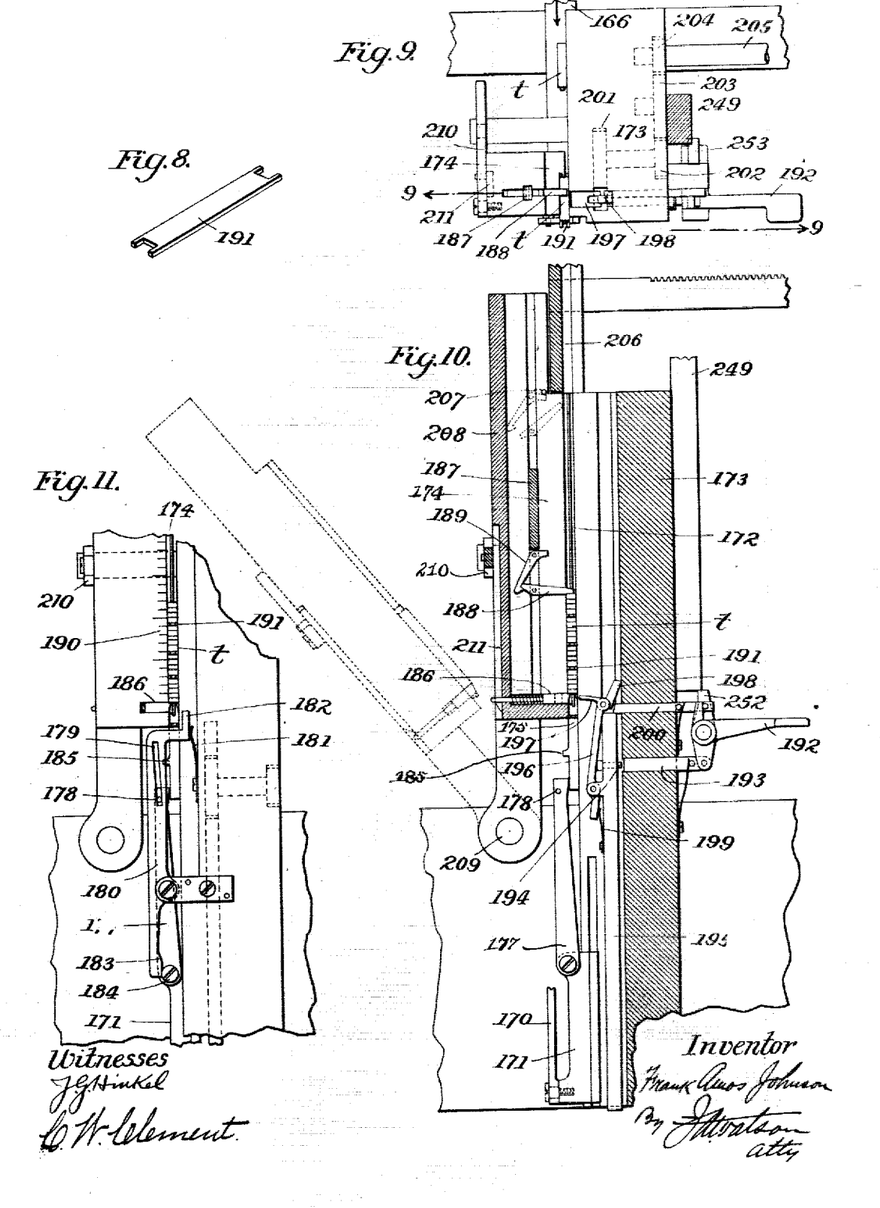
Fig. 8 is a perspective view of one form of temporary space which may be used.
Figs. 9, 10, and 11 are details of the "stick" or assembling-channel and the line-assembling devices, Fig. 9 being a plan, Fig. 10 a vertical section about on the line 9 9 of Fig. 9, and Fig. 11 a front elevation.

The various parts of the mechanism are supported on a main frame, which may be of any form suitable for the purpose. Supported on the upper part of the frame are two magazines 101 102, one of which is for the lower-case characters and the other for upper-case characters. The magazines have fixed or permanent channels 103 in their lower parts and removable and portable channels 104 in their upper parts, the removable channels being arranged to discharge type into the permanent channels. As shown in Figs. 4, 5, and 6, the removable channels each comprises side walls 106 107, the front wall 108, and a rear wall 109. When the channels are removed, the type in them are sustained by detachable supports 110. These supports are right-angled pieces, each having a horizontal arm 111 adapted to enter the channel and support the type, and a vertical arm 112, which has projection 113 fitting an opening 114 in the front wall 108. The supports are also provided with shoulders 115 which engages the inside of the front walls 108 at the bottom and forms fulcrums upon which the supports turn. It will be seen that when one of the supports occupies the position indicated in full lines in Fig. 4 the weight of the type will tend to turn it about the fulcrum 115, which will hold the projection 113 securely in the opening 114. When the support is in this position, the channel 104 can be transported filled with type. The movable channels are adapted to rest in notches 116 117 in the upper ends of the fixed magazine-channels 103, and they are retained in vertical position by pins 118 on a bar 119, as shown in Fig. 4. The partitions of the lower magazine-channels are supported in walls 120 and they are provided with flanges 121 at their outer edges to hold the type in line. Openings are provided at the lower ends of the channels through which single type may be ejected.

The type from the front magazine are delivered to an assembling-apron 122 by ejectors 123 and the type from the rear magazine are delivered to an assembling-apron 124 by ejectors 125. The ejectors 123 extend through the upper part of the apron 124, and the ejected type from the rear magazine pass down between the ejectors 123, the front and rear magazines and ejectors being staggered for this purpose. The type from the front magazine are ejected against buffers 126, and the fender 127 is provided for preventing the type from the first magazine from being thrown up as they strike the buffer.

The ejectors all have flexible portions 128, and their rear ends 129 are turned upward and then outward to engage the undercut groove 130 in a common ejector-bar 131. Bar 131 has a parallel movement, being connected by links 132 and arms 133 with a rock-shaft 134. An arm 135 on the rock-shaft is connected by link 136 with a crank or arm 137 on the escape-shaft 138. The escape-shaft is in line with a constantly-running shaft 139, on one end of which is a drive-sheave 140 and on the other end a crown ratchet-wheel 141. On the adjacent end of shaft 138 is a radial pawl 142, having one end adapted to engage the ratchet-wheel and the other end reversely turned and adapted to engage a cam-surface 143 on a vertically-moving slide 144. Figs. 3 and 7. When slide 144 is raised, spring 145 is permitted to throw the pawl into engagement with the rotating ratchet-wheel. The engagement of these parts rotates the shaft 138. Slide 144 is dropped before the shaft makes a complete revolution and the tail end of pawl 142 rides up on the cam 143, throwing the pawl out of engagement with the ratchet-wheel. On completion of the revolution the pawl strikes a projecting shoulder 146 on slide 144 and stops the shaft 138. Slide 144 is raised by a rod 147, elbow-lever 148, link 149, arm 150, rock-shaft 151, and bail 152, said bail lying over the rear ends of the key-levers 153. It will be seen that whenever a key is depressed the shaft 138 will make one complete revolution, causing the ejector-bar to move toward the magazines and return, carrying with it any ejector which has been rendered operative by the key depressed.

Beneath the rear ends of the ejector-bars are lift-rods 154, which normally rest on a fixed bar or shelf 155. The bar 155 is provided with a ledge 156, on which the rods rest when raised, and with a flange 157, which forms the back-stop for the rods. The lower ends of the rods are guided between the bar 155 and the rod 158. The lift-rods are raised by inclined push-rods 159, the lower ends of which rest in notches in the rear ends of the levers 153. A rocking blade 160 in the rear of the lift-rods is operated to restore said rods to their normal position by an arm 161, connected with the blade and a pin 162 on the arm 133. When a key is operated, it raises the rear end of the corresponding ejector and at the same time starts the escape-shaft, which moves the ejector-bar to drive the ejector forward and then return it, discharging the required type on the assembling-apron.

The assembling-aprons 122 124 are provided with guiding-ribs 163 and with side ribs which guide the types to common delivery-points 164 165, at which points the type are deposited on a constantly-running belt 166, which carries them to the stick or assembling-channel. Belt 166 runs over a drive-pulley 167 and sheave 168 and a second sheave 169, the latter being connected by a crank-pin and a connecting-rod 170 with an elevator-slide 171.

The type are delivered at the lower end of the assembling-channel or stick 172, Figs. 3, 9, 10, and 11, which is formed by a bracket 173 and a grooved bar 174. A type-elevator 175 normally stands with the upper ends of its arms or prongs just below the point of delivery of the type, being held in this position by a spring 176. To the constantly-moving slide 171 is connected an elevator-lifting pawl 177. The upper end of this pawl has a pin 178, which travels in a slot 179 in a trigger-lever 180. Spring 181 constantly tends to hold the upper end 182 of lever 180 in the path of type arriving from the belt 166. A cam 183 on the lower end of lever 180 is engaged by pin 184 on slide 171, throwing lever 180 out of the path of the type at each reciprocation of the slide 171. The trigger-lever 180 is thus caused to constantly vibrate into and out of the path of the type when no type is present at the lower end of the assembling-channel. The pin and slot 178 179, therefore, normally guide the upper end of the elevator-pawl 177 past a shoulder 185 on the type-elevator. When a type arrives at the stick, the trigger-lever is prevented from entering and the pawl 177 is caused to engage the shoulder 185 and raise the elevator-slide 175, which in turn raises the type past a pair of spring retaining-pawls 186. When the elevator recedes, the type is left supported on the pawls 186. The type in the stick are held compactly by a yielding resistant comprising a slide 187, pivoted arm 188, extending from said slide into the path of the type, and a retaining-pawl 189 for said arm, the pawl and the arm being pivoted to the slide 187. The amount of matter assembled in the line is indicated on the scale 190. The type t are assembled with separators 191 between the words, the separators being preferably of the form illustrated in Fig. 8, notched at both ends to ride on the bars 174.

When the required amount of type for a line has been assembled in the channel 172, the starting-lever 192 is depressed. To the lower arm of said lever is connected a bolt 193, which, operating through pin 194 in the line-lifting rack 195, throws a pivoted arm 196 toward the stick carrying its horizontal end 197 under the type in the stick. A gravity-pawl 198 drops into horizontal position to hold the lever 196 in this position against the pressure of the spring 199, Fig. 10. At the same time latch 200, which holds the rack 195 in its lowest position, is withdrawn, permitting said rack to be raised by a train of gears 201, 202, 203, and 204, the latter being on shaft 205, which is under tension to revolve, as will be hereinafter explained. The lifting-rack 195 is thus moved upward, carrying the line of type into a transfer-channel 206 in line with the assembling-channel. As the upper end of the line reaches the channel 206 pawl 189 is tripped by a pin 207 and arm 188 released. The pawl and arm assume the position shown in dotted lines in Fig. 10 and the slide 187 moves back to its lowest position. After the arm 188 passes below the line of type the parts reëngage, as shown in full lines in Fig. 10, ready to offer resistance to the type in the succeeding line. Access is had to the assembling-channel by swinging the block 208, which carries the bar 174 and other parts back upon its pivot 209, as indicated in dotted lines in Fig. 10. A latch 210 is provided for holding the block 208 in operative position. When the block 208 swings back, the assembled type in the stick are carried with it, being held between the pawls 186 and the resistant 188. The pawls 186 project but slightly into the stick while type are being assembled, being prevented from projecting farther by the engagement of bolt 211 with their rear ends. The bolt 211 is connected to the latch 210 and when the latch is raised the bolt is withdrawn and the pawls 186 project the full width of the type in the stick, thus forming a sufficient platform upon which the line may rest for inspection and correction while in the position illustrated in dotted lines, Fig. 10. As the stick is again closed the supporting-pawls 186 are partially withdrawn by the wedge-shaped lower end of the bolt 211.

Figure 1:
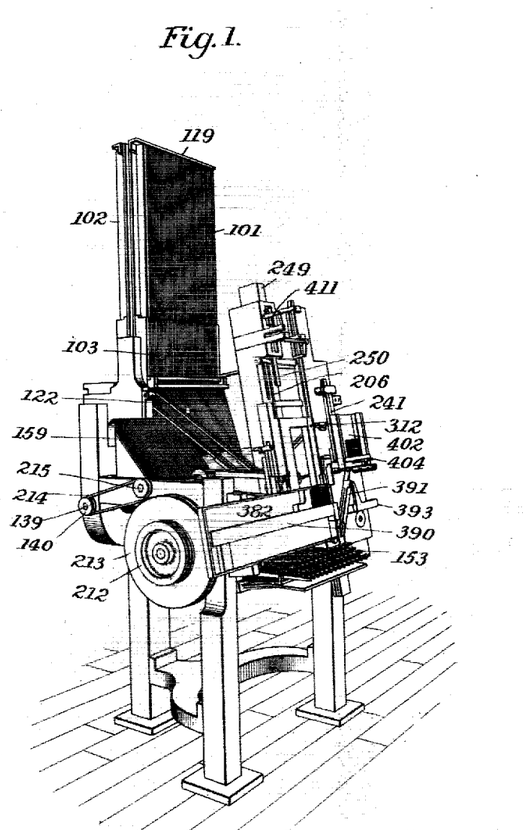
Figure 1 is a perspective view of the entire machine.
Figure 24:
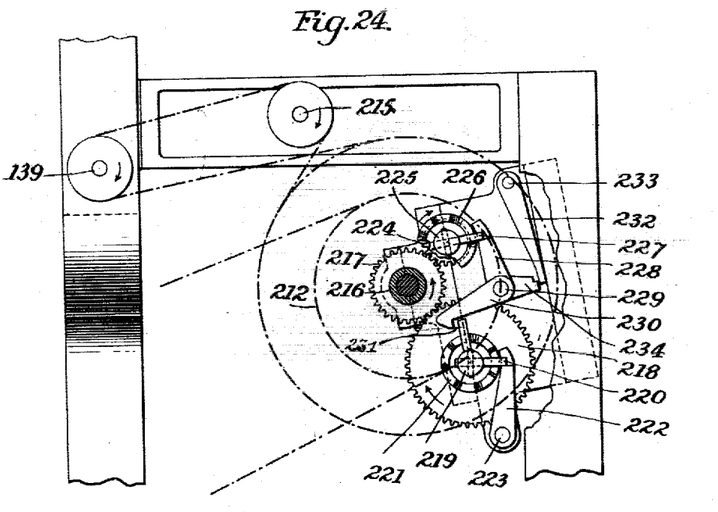
Fig. 24 is an elevation of the starting and stopping clutches of the driving mechanism, looking from the left.

The machine, as shown, is driven by a pulley 212, Figs. 1 and 24, to which is connected a second pulley 213. A belt 214 on pulley 213 drives the running-shaft 139, Fig. 7, and the shaft 215, which carries the drive-pulley 167 of the assembling-belt 166. Pulley 212 is mounted on a sleeve 216, and on the same sleeve is fixed a gear 217. Gear 217 is in mesh with a gear 218, running loosely on the line-shaft 219. Arranged diametrically on shaft 219 is a pawl 220, which constantly tends to spring into engagement with the teeth of a ratchet-wheel 221 on the running-gear 218. Pawl 220 is normally held out of engagement with the ratchet-wheel by a cam-arm 222 on rock-shaft 223. When this shaft is rocked, the arm 222 releases pawl 220, permitting it to engage with the ratchet-wheel 221. After the ratchet-wheel makes one revolution the pawl rides up on the cam-arm 222 and out of engagement with the ratchet-wheel and comes to rest on a shoulder of the cam-arm, thus stopping the line-shaft.

A gear 224, running freely on the space-shaft 225, is also in mesh with the running-gear 217. Connected with gear 224 is a crown ratchet-wheel 226, and radially mounted in the shaft 225 is a pawl 227, tending to spring into engagement with the ratchet-wheel, but normally held apart from said ratchet-wheel by a cam-arm 228, similar to the cam-arm 222. Arm 228 is on rock-shaft 229, which also carries an arm 230, extending into the path of arm 231 on shaft 219. As the line-shaft 219 revolves it rocks arms 230 and 228, permitting the pawl 227 to engage the ratchet-wheel 226. The space-shaft is thus started. To prevent it from being stopped at the end of a single revolution, an arm 232 on rock-shaft 233 is arranged to latch the arm 234 on the rock-shaft 229. Shaft 225 is thus made to continue rotating until all of the separators of the line have been withdrawn and the spaces inserted, after which latch 232 is withdrawn, releasing the cam-arm 228 and permitting it to disengage the pawl 227 from its ratchet-wheel.

It has been stated that when the starting-key is struck the line-lifting rack 195 is raised by means of the shaft 205 and intermediate gearing. On the right end of shaft 205 is a pinion 235, which is in mesh with a rack 236 of sufficient weight to raise the lifting-rack and the line. As the rack 236 descends a pin or shoulder on said rack engages an arm 237, Fig. 17, on the rock-shaft 223, Fig. 24, and effects the starting of the line-shaft 219, which makes one revolution and in turn starts the space-shaft 225. In this manner the line-shaft and the space-shaft are started by the movement of the starting-key 192. After the line is raised into the transfer-channel 206 said channel is moved to the right by means of its connected rack 238, gear 239, pinion 240, rack 241, actuated when struck by the lever 258, operated by cam 257, Figs. 2 and 12. The starting-rack 236 is raised by a cord 242, connected to the hub of a pulley 243 on the line-shaft, said pulley being given one revolution for each line and then released to permit the rack to drop. Adjacent to pulley 243 is an arm 244, fixed on shaft 219 and carrying a pawl 245, which is normally held in position to engage a shoulder 246 on the pulley by a spring 247. As the shaft revolves, the pawl carries the pulley around with it until it has nearly completed a revolution, when the pawl encounters a projection 248, which trips it, releasing the pulley and its connected weights and permitting the weights to fall.

Figure 2:
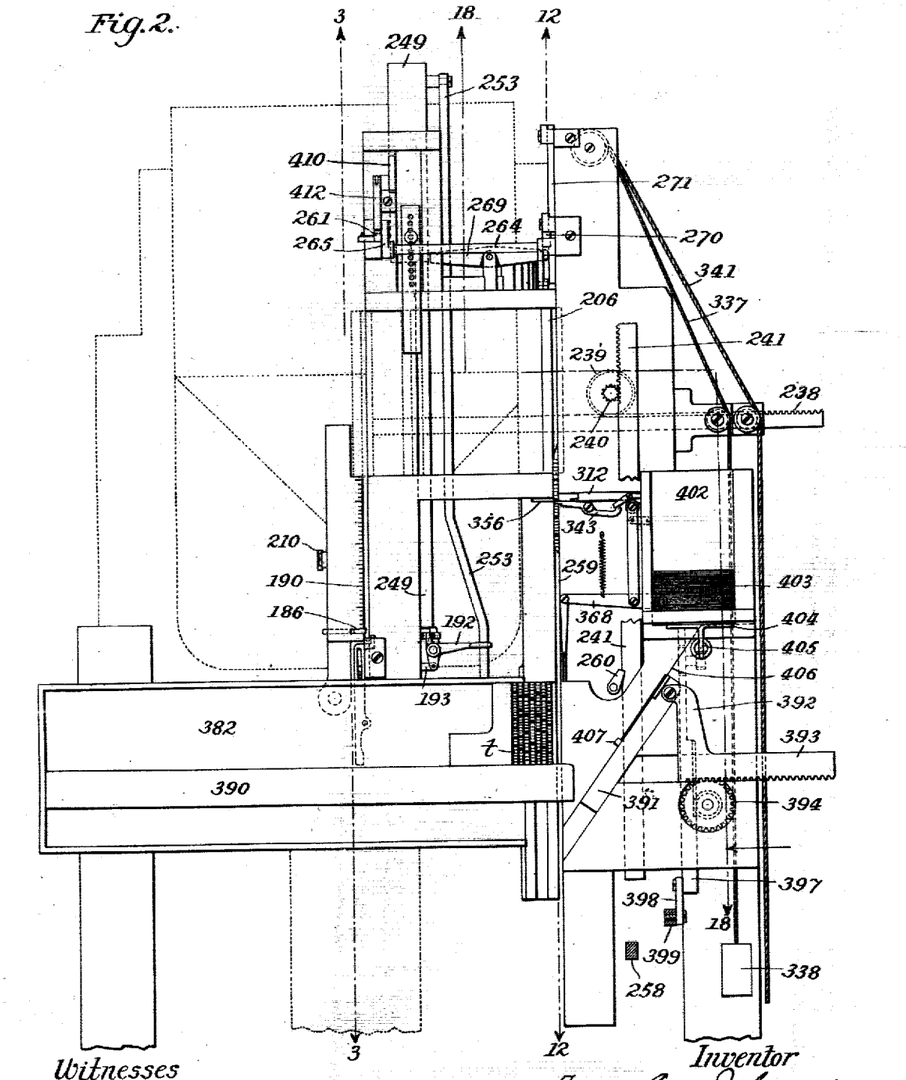
Fig. 2 is a front elevation of a portion of the machine, the keyboard and space-casting mechanism being omitted and the magazine shown in dotted lines.
Figures 19, 20, 21, 23:
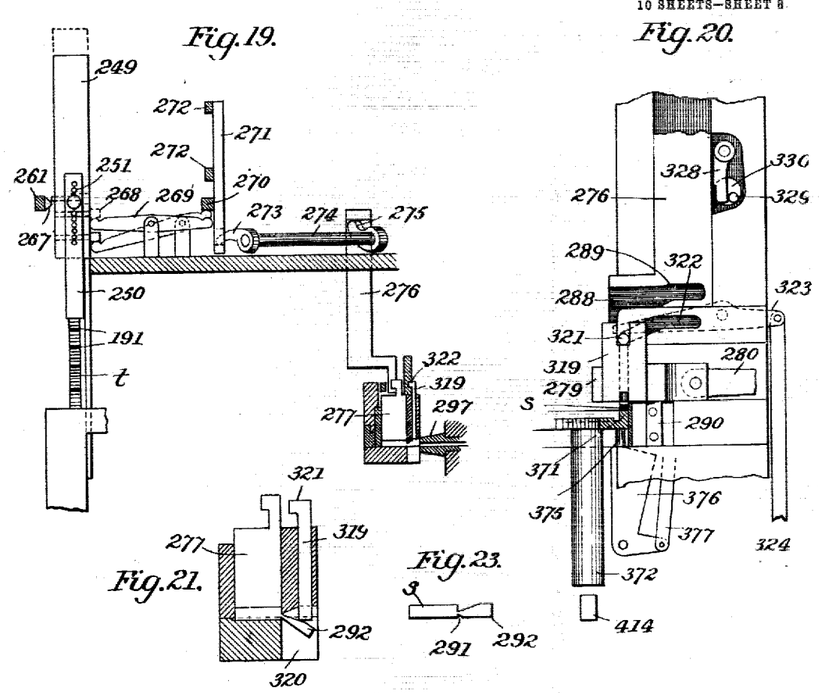
Fig. 19 is a detail of the justifying mechanism, illustrating the devices for measuring the line and adjusting the mold.
Figs. 20, 21, and 22 are detail views of the mold and adjacent parts.
Fig. 23 is a side view of a space with jet attached.

The first movement of the transfer-channel 206 brings it to rest in line with a measuring-slide 249, Figs. 2, 3, and 19. Slide 249 has an adjustable leg 250, which rests upon the line when the slide is permitted to descend. Leg 250 is adjustable upon the slide by means of a series of perforations 251 and a suitable clamping-screw to adapt the machine for handling lines of different lengths or measure. The slide is sufficiently heavy to compact the line for exact measurement. The slide 249 normally rests on an arm 252 of the starting-lever 192, and it is released when the starting-lever is operated, Figs. 2, 9, and 10. The slide is raised after each line is measured by a link 253 and cam 254 on shaft 219, the lower end of the link being guided by a link 255, which is pivoted to the main frame, Figs. 2 and 3. When the starting-lever is operated, slide 249 is dropped until its cam-roll 256 rests on the cam 254. The subsequent rotation of the cam lowers the slide gradually, bringing the leg 250 into engagement with the line of type. The justifying devices hereinafter described are partially governed by the movement of the slide 249.

Figures 12, 13:
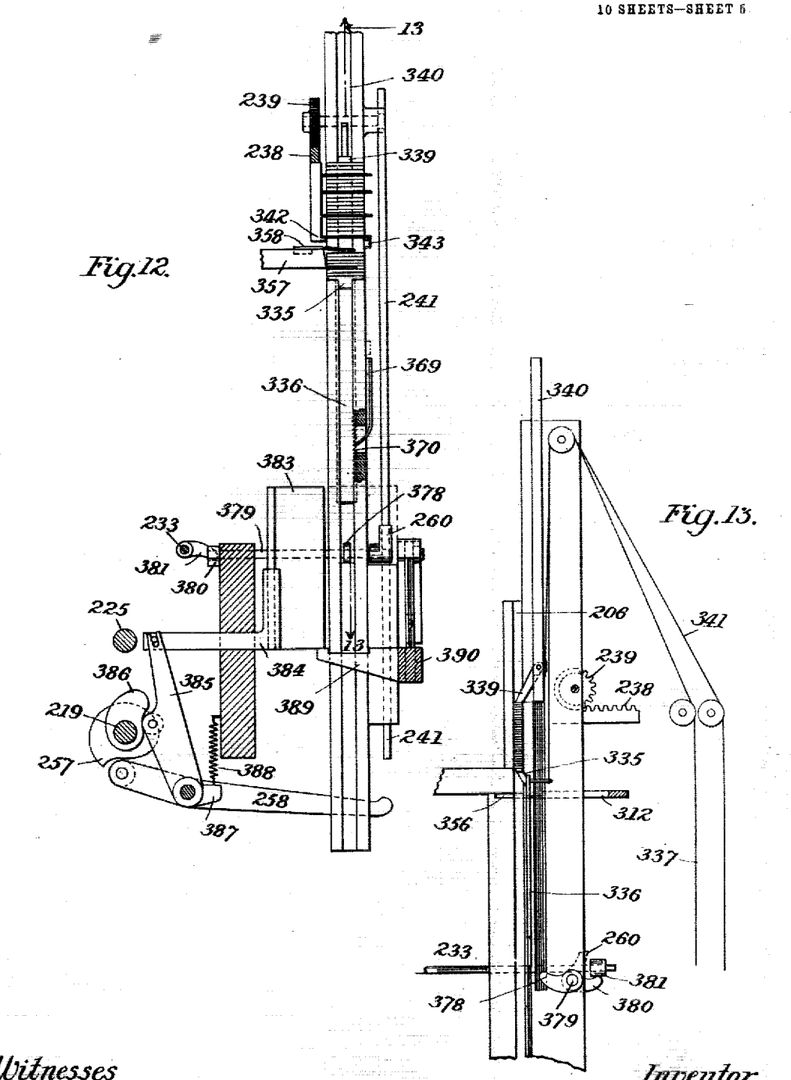
Figs. 12 and 13 are details of the mechanism for removing separators and inserting justifying-spaces, Fig. 12 being a section on the line 12 12 of Fig. 2, and Fig. 13 a section about on the line 13 13 of Fig. 12.

The rack 241 is operated positively to carry the transfer-channel from its initial position into alinement with the measuring-slide by a cam 257 on line-shaft, said cam operating on lever 258, Fig. 12. After the line is measured the cam 257 moves the rack 241 to shift the transfer-channel farther to the right into alinement with the justifying-channel 259, Fig. 2. The parts are held in this position by a pawl 260, which engages a notch in the rack 241 until the line is justified and entirely moved out of the transfer-channel. After the line is justified the rack 241 is released, and its weight serves to return the transfer-channel to its initial position to receive a new line.

*Justifying mechanism.*—The justification of the lines of type depends, as in other machines of this class, upon the line "shortage" or the length of the unjustified line and upon the number of word-spaces in a line. Theoretically each justifying-space should be equal to the total shortage of the line divided by the number of spaces. In the present instance the words are separated by thin separators, which are afterward substituted by cast justifying-spaces. These separators are measured with the line and due allowance made for their width in adjusting the mold to cast the justifying-spaces.

Figures 17, 18:
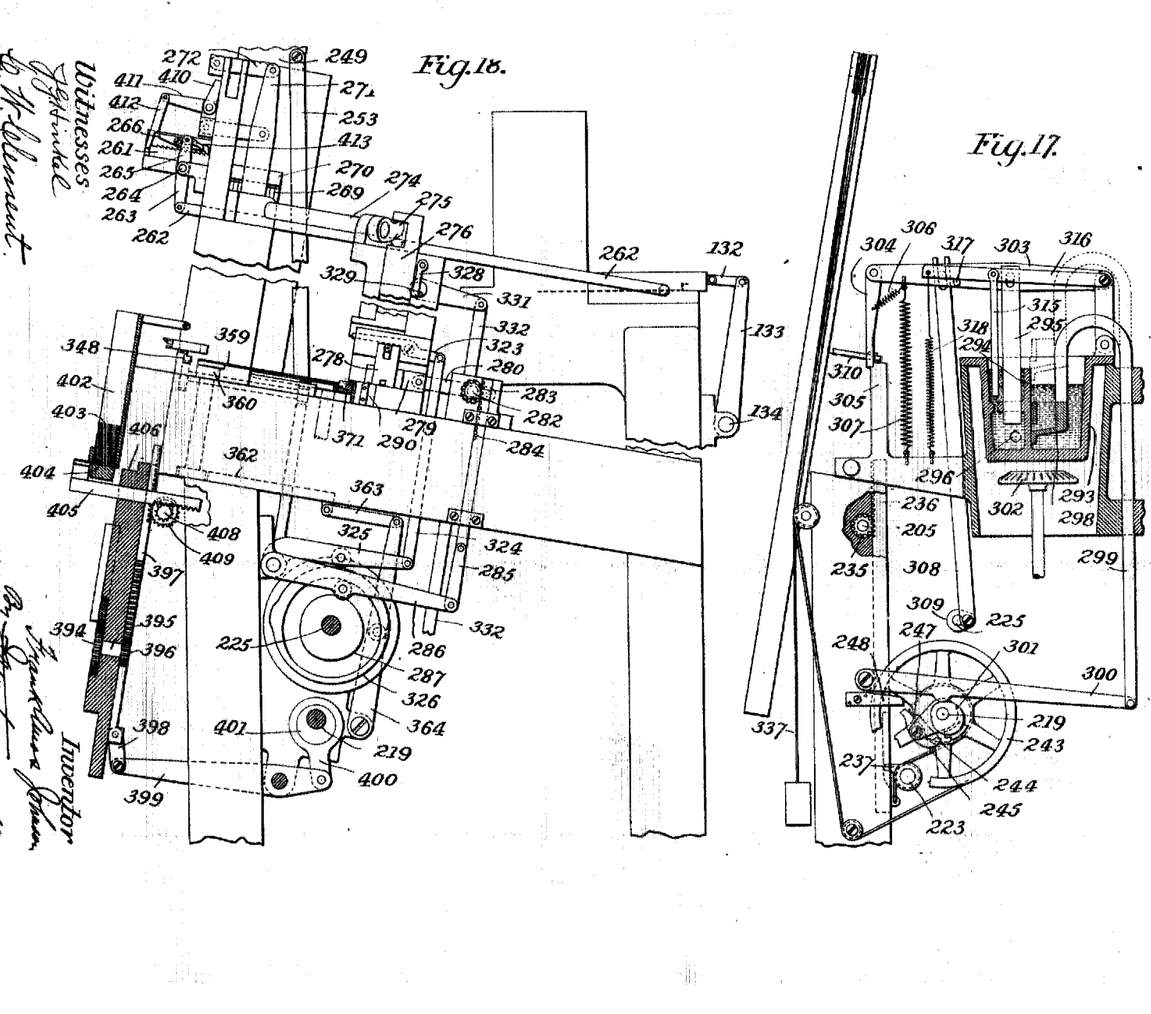
Fig. 17 is a vertical section through the melting-pot and pump of the space-casting mechanism.
Fig. 18 is a side elevation, partly in section, on the line 18 18 of Fig. 2.

The number of word-spaces in each line is counted by connecting a counting-rack 261, Fig. 18, with the ejector 125 at the right end of the magazine, which delivers the separators from the magazine, which is similar to the type-magazines, Fig. 18. These connections, as shown, are link 262, arm 263, rock-shaft 264, and arm 265, carrying a pawl 413, which feeds the counting-rack 261 along step by step as the separators are inserted in a line. Rack 261 is also provided with a holding-pawl 266. When a line has been assembled, a projection 267 upon the counting-rack, Fig. 19, will stand opposite one of a series of pins 268 in the compacting-head 249, corresponding to the number of separators in a line, and as the compacting-head descends to measure the line this pin will be pushed out by the incline projection into position to engage one of a series of levers 269. The levers 269 are of uniform length, but have their fulcrums arranged at different distances from their ends. One lever for use in justifying a line having two words and one separator is fulcrumed midway of its length. The next lever is for a line having three words and two separators, and it is fulcrumed at two-thirds of its length measuring from its point of contact with one of the pins 268. The other levers are fulcrumed at three-fourths, four-fifths, &c., of their length, and the series of levers are capable of dividing the shortage of the line by the number of separators or word-spaces in the line. The counting-rack 261 renders the proper pin in the compacting-head operative, and said pin rocks a corresponding lever an amount proportionate to the downward movement of the compacting-head, which movement is proportionate to the shortage of the line. It follows that the opposite ends or shorter arms of the several levers are moved distances corresponding to the required thicknesses of justifying-spaces. The levers operate upon a cross-piece 270, carried by a vertically-arranged bar 271, which in turn is guided by parallel links 272, Figs. 18 and 19. Bar 271 operates on arm 273 to rock a shaft 274, having on it a second arm 275, which adjusts a mold-slide 276. Slide 276 at its lower end is connected with the body-piece 277 of the mold in which the spaces are cast.

A spring (not shown) tends to return the word-counting rack to starting position. As soon as the mold has been set the rack is freed and returned by raising the pawls. As the compacting-head 249 descends a cam-surface on the head engages arm 410, rocking a connected arm 411, to the outer end of which is connected a depending leg 412, which engages the tail end of the pawl 266, disengaging said pawl from the rack. Pawl 266 raises the moving pawl 413 and frees the rack, which returns to its initial position, Figs. 2 and 18.

Figure 22:
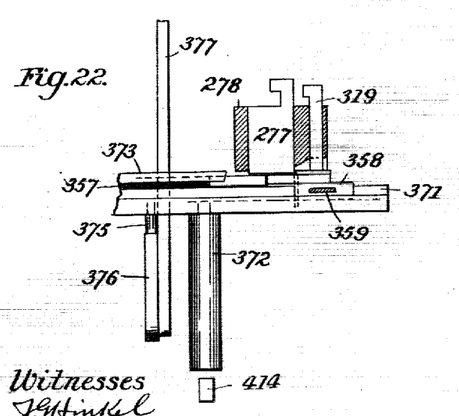

The mold proper, 278, is carried by a sliding yoke 279 and is movable from a casting position opposite the nipple of the melting-pot (illustrated in Fig. 19) to a position in which the spaces may be ejected into a runway, which position is illustrated in Figs. 20 and 22. The mold slide or yoke 279 is reciprocated by link 280, crank 281, rock-shaft 282, pinion 283, rack 284, link 285, cam-lever 286, and cam 287 on the line-shaft 225, Figs. 14, 16, and 18. The body-piece 277 carries a pin, which engages with slot 288 in the lower part of the slide 276, Fig. 20. Slot 288 is of the same width as the pin at its rear end, while at its other end it is wide and permits the body-piece to be moved. Thus while the mold is in the casting position the body-piece is connected without lost motion to the slide 276, and when the mold is in the ejecting position the body-piece is permitted by the width of the slot 288 to have a vertical movement. In moving from the casting to the ejecting position the body-piece is first given a slight downward movement by shoulder 289 of slot 288. This ejects the space partially from the mold, and during the further movement of the mold a knife 290, Fig. 20, cuts a groove 291 in the justifying-space s to facilitate the breaking off of the jet 292.

The melting-pot 293 is divided by partition 294 into two compartments. One of these compartments constitutes the pump, in which the pump-plunger 295 operates to eject the metal through an opening 296 to a nozzle 297, Figs. 14, 17, and 19. In the other compartment a dipper 298 is reciprocated vertically from the position shown in full lines, Fig. 17, to the position shown in dotted lines by means of rod 299, cam-lever 300, and cam 301 on the line-shaft 219. By this means the pump-compartment is kept full of type-metal. The pot is heated by a suitable gas-burner 302.

The pump-piston is operated by a lever 303, Fig. 17, which is normally sustained in its most elevated position by a pivoted leg 304, which rests on a fixed support 305. Leg 304 is normally drawn toward the support 305 by a spring 306. A second spring 307 tends to draw the pump-lever down. The lever is raised at each rotation of the spacing-shaft 225 by a link 308, which is connected to a crank 309 on the end of said shaft. Each time the link 308 is raised it raises the pump-piston, and the pump-lever is left in this position with the leg 304 resting on the support 305, while the link 308 descends, the latter having a pin-and-slot connection with the lever. When the mold is adjusted and at the proper moment for casting, the leg 304 is moved off its support by an elbow-lever 310, Figs. 14, 15, and 17, said lever being operated by a latch 311, which is hooked to the ejecting-yoke 312. As the yoke moves to the left the bell-crank is turned sufficiently to throw the sustaining pawl or leg 304 off of its support 305. During the further movement of the ejecting-yoke the latch 311 is disengaged from it by a pin 313, which operates on an incline 314. When the yoke again moves to the right, the latch 311 is reëngaged with it. The pump-chamber is provided with a valve 315, which is connected to a lever 316. The lever 316 is raised by a pin 317 and drawn down by a spring 318. Valve 315 is opened at the proper time to receive metal and closed when the pump is finishing its stroke.

In the side of the mold is a jet-breaking slide 319, which is depressed at the proper time to break off the jet, as shown in Fig. 21, and discharge the same through an opening 320. It may be here stated that the jets are of uniform size regardless of the thickness of the space, being considerably thicker than the thin spaces. I have found that thin spaces can be cast better with a thick jet than, as heretofore, with a jet corresponding in thickness to the space. The jet-breaker 319 has a projection 321, which operates in a slot 322. Slot 322 is downwardly inclined at its forward end, as shown in Fig. 20, and as the mold moves forward the jet-breaker is driven down. As the mold moves back to the casting position the jet-breaker rises and does not obstruct the flow of metal from the nozzle to the mold.

When the mold is in the discharging position, as illustrated in Fig. 20, the body-piece is moved down to discharge the space by means of lever 323, link 324, cam-lever 325, and cam 326 on shaft 225, Figs. 18 and 20. During the casting of the space the gage-slide 276 is clamped by means of lever 328, which is operated by a crank-pin 329, Fig. 20, on a shaft 330, Figs. 16 and 18. Said shaft is rocked by means of arm 331, link 332, cam-lever 333, and cam 334 on the line-shaft 219.

*Space-inserting mechanism.*—The transfer-channel 206 after its second movement to the right rests in alinement with the justifying-channel 259, as previously explained. When the line of type reaches this position, it is received upon a preceder-head 335, Figs. 12 and 13, which preceder is carried by a slide 336 and supported by cord 337, to which is connected a weight 338 sufficient to overbalance the preceder-head and the line resting thereon, Figs. 2, 13, and 17.

Normally supported above the transfer-channel 206 is a follower-head 339, connected to a heavy follower-slide 340, which slide is raised once for each line by a cord 341, passing around suitable pulleys and connected to the sheave 243, Figs. 12, 13, and 17.

Figures 14, 15, 16:
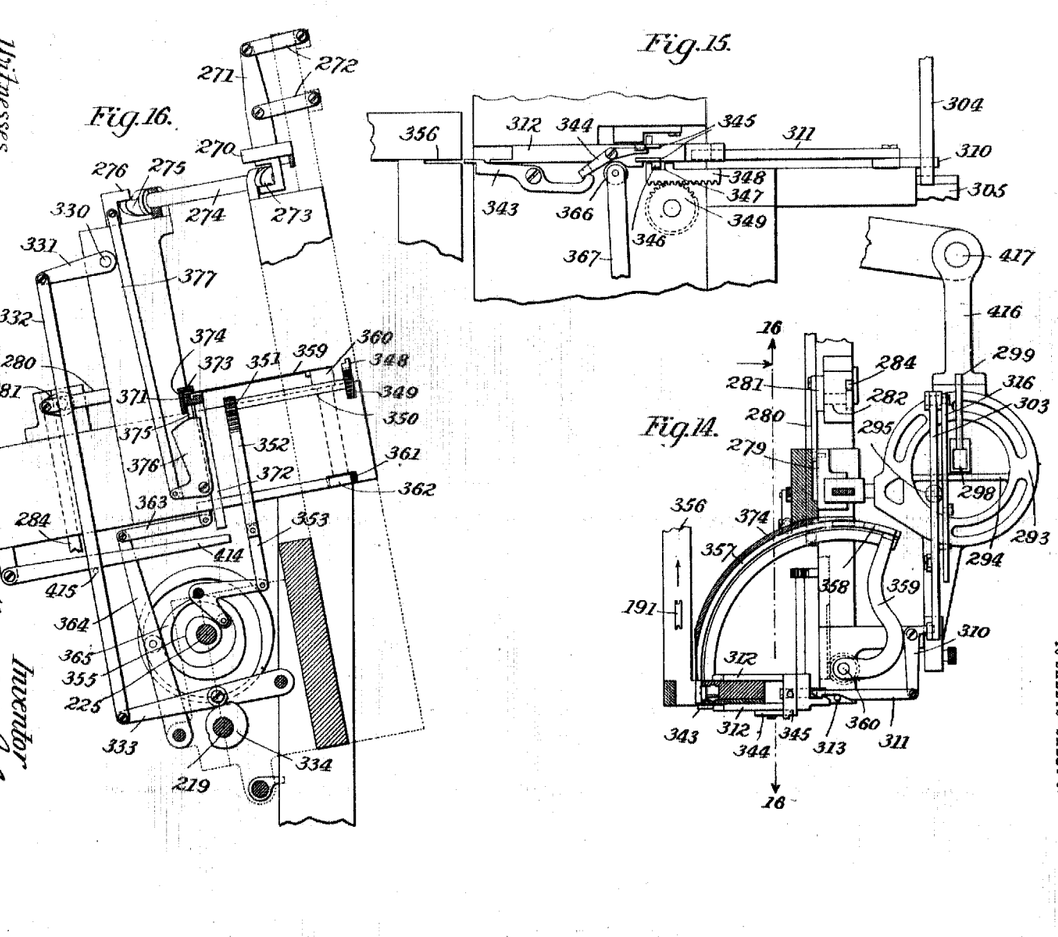
Fig. 14 is a plan view of the space-casting mechanism.
Fig. 15 is an enlarged view of the separator-ejector and adjacent parts.
Fig. 16 illustrates the space-casting mechanism in elevation and partly in section on the line 16 16 of Fig. 14.

When the transfer-channel is brought into alinement with the justifying-channel, the sheave 243 is released by pawl 245 engaging projection 248, and the follower-head 339 is permitted to descend, carrying with it the line of type and separators until the rear projecting end of the first separator engages a support 342 and the forward end of the separator strikes a trigger 343, Figs. 12 and 15, the trigger-lever 343 being slightly rocked upon its pivot. The trigger-lever operates a latch 344, Figs. 14 and 15, which releases a transverse slide 345, mounted on the ejecting-yoke 312. Slide 345 is drawn to the rear, (by a spring,) carrying a projection 346 into engagement with a notch 347 on a rack 348. Rack 348 is reciprocated by means of gear 349, shaft 350, pinion 351, vertical rack 352, link 353, cam-lever 354, and cam 355 on the spacing-shaft 225, which shaft has been started by the rotation of the line-shaft. Each separator operates on the trigger to connect the ejector 312 with the reciprocating rack 348, and at the succeeding revolution of the spacing-shaft 225 the ejector moves forward, pushing the separator out of the line and onto an inclined chute or runway 356, Fig. 14, down which it slides to a suitable receptacle. Simultaneously the pump is released by the elbow-lever 310, which is connected with the ejecting-yoke 312, as previously described, and the space is cast. The mold is then carried from the casting-point to a circular runway 357, leading from the mold to the justifying-channel. The space is ejected into the runway 357, as heretofore explained, and is then carried through ninety degrees of said runway by a pusher 358, carried by a flexible arm 359 upon a vertical rock-shaft 360, Figs. 14, 16, 20, and 22. The rock-shaft 360 is operated by pinion 361, rack 362, link 363, cam-lever 364, and cam 365 on shaft 225. At the first part of the forward movement of the ejecting-yoke 312 a cam-surface on said yoke operating on roll 366 depresses a link 367, Figs. 2, 12, and 15. To link 367 is connected a lever 368, carrying a pawl 369, which engages ratchet-teeth 370 on the preceder-slide 336. The preceder-head 335 is thus temporarily lowered, opening the line beneath the separator which rests on the support 342 and the trigger-lever 343, as shown in Fig. 12. The separator ejecting-yoke 312 has an intermittent forward movement. It advances until its forward end reaches the right wall of the justifying-channel and then rests until a space has been cast and carried from the mold by the pusher 358 into the opening of the line created by the downward movement of the preceder-head. Fig. 12 shows a space just arriving in the line. The movement of the ejecting-yoke is then completed, throwing a separator onto the chute 356 and permitting the line to descend until the next separator rests on the support 342 and operates the trigger 343.

The channel 357 is adjusted to correspond with the different thicknesses of spaces required for different lines, the width of the channel for each space being just sufficient to permit the space to pass freely through it. By this means very thin spaces can be handled without danger of having them bend or stick in the channel, and the thickest spaces can be handled in the same channel. The channel 357 is inclosed within a circular rail 371, which is carried by a vertically-movable post 372 and a stationary circular cap-rail 373, having a depending flange 374, Figs. 14, 16, 20, and 22. On the rail 371 is a pin 375, which rests during the casting operation on the inclined surface of a cam 376, which is connected by a link 377 with the gage-slide 276, Fig. 16. The curved guide-rail 371 is raised prior to setting the mold and then lowered when the mold is adjusted until its supporting-pin 375 rests on the cam 376. The rail is raised by a lever 414, Figs. 16 and 22, having its free end arranged beneath the plunger 372. Lever 414 is engaged by a pin 415 on the link 332, which operates the mold-gage clamp 328. It thus follows that when the mold-gage is not clamped the guide-rail 371 will be raised to its highest position, and when the mold-gage is clamped the guide-rail will rest on the variable cam-support 376, which adjusts the channel to the width of the space.

After the last justifying-space has been inserted and the last separator ejected from a line the follower-head pushes the line downward into the justifying-channel until the preceder-slide strikes an arm 378 and rocks the shaft 379, withdrawing the pawl 260 on said shaft from rack 241 and permitting the transfer-channel to return to its initial position in line with the assembling-channel. Shaft 379 also carries an arm 380, which engages an arm 381 on the rock-shaft 233, which carries the latch 232, Figs. 12, 13, and 24. When the shaft 379 is rocked by the descending line, the latch 232 is withdrawn and the clutch-lever 228 permitted to spring into engagement with the pawl 227, thus stopping the movement of the space-shaft 225.

For convenience in obtaining access to the mold the melting-pot 293 is carried on an arm 416, pivoted to a bracket at 417. The melting-pot is held in operative position by a suitable fastening, but may be moved away from the mold when desired.

*Galley mechanism.*—At the beginning of each revolution of the line-shaft the line previously assembled and justified is moved forward from the justifying-channel to a position in register with the galley 382 by a blade 383, carried in vertical guides in a slide 384, which is reciprocated by cam-lever 385 and cam 386 on line-shaft 219. Connected with lever 385 is an arm 387, to which is attached a spring 388. The line-ejecting blade 383 rests on an arm 389 on the bar 390, which forms the adjustable lower wall of the galley, Figs. 2 and 12. The line is then moved into the galley by a pusher 391, pivotally connected to an arm 392 on a rack 393. When the rack moves back, the pusher 391 assumes an inclined position, as shown in Fig. 2, in which position a lead may be delivered to it by the leading apparatus, as will be hereinafter explained. When the rack 393 moves forward, the pusher assumes a vertical position. Rack 393 is reciprocated by gear 394, shaft 395, pinion 396, rack 397, link 398, lever 399, eccentric-rod 400, and eccentric 401 on line-shaft 219, Figs. 2 and 18.

In front of the machine is a lead-magazine 402, which may contain a series of leads 403. A pusher 404 on rack 405 is arranged to eject the lowest lead onto an inclined ledge 406 in line with the inclined position of the galley-pusher 391. The lead will slide down onto said pusher and be stopped in proper position by a projection 407, Figs. 2 and 18. The lead-ejector is driven by pinion 408 and gear 409 in mesh with rack 397. If it be desired to lead the matter in the galley, it is simply necessary to place a supply of leads in the lead-magazine.

*Operation.*—A line of type and separators are assembled in the stick or assembling-channel by simply operating the proper keys of the keyboard. On moving the starting-lever the swinging head of the line-lifting rack is thrown under the line and the rack released, permitting the weight-rack 236 to raise the line into the transfer-channel 206 and to start the line-shaft. The transfer-channel then carries the line to the right and stops under the compacting and measuring slide 249. This slide is lowered onto the line, and through the connections described it simultaneously adjusts the body-piece of the mold to proper position to cast justifying-spaces for the line. The position of the body-piece is determined by the movement of the measuring-slide and the number of separators in the line, the movement of the slide being divided by the number of separators by means of one or other of the dividing-levers 269. The transfer-channel is then moved into register with the justifying-channel and the line is clamped between the follower-head and the preceder-head, the follower being weighted sufficiently to overcome the resistance of the preceder. Under the influence of the follower the line moves into the justifying-channel until the projecting ends of the first separator engage the support at one side of the line and the trigger at the other side. The trigger starts the casting mechanism, which casts a space, and it also starts the ejecting mechanism to eject the separator. While the space is being cast and before the separator is ejected, the preceder is moved down to create an opening in the line just below the suspended separator. The cast space is then moved through the circular channel into the line, and the separator is afterward ejected from the line. This completes the operation of substituting a justifying-space for one of the separators. The line descends intermittently, and these operations are repeated for each separator. When the last separator has been ejected, the line drops to the level of the galley and remains there until the succeeding line has been assembled. While the succeeding line is being transferred to the justifying devices the first-mentioned line is transferred to the galley, with or without a lead, as may be desired.

Figures 25, 26:
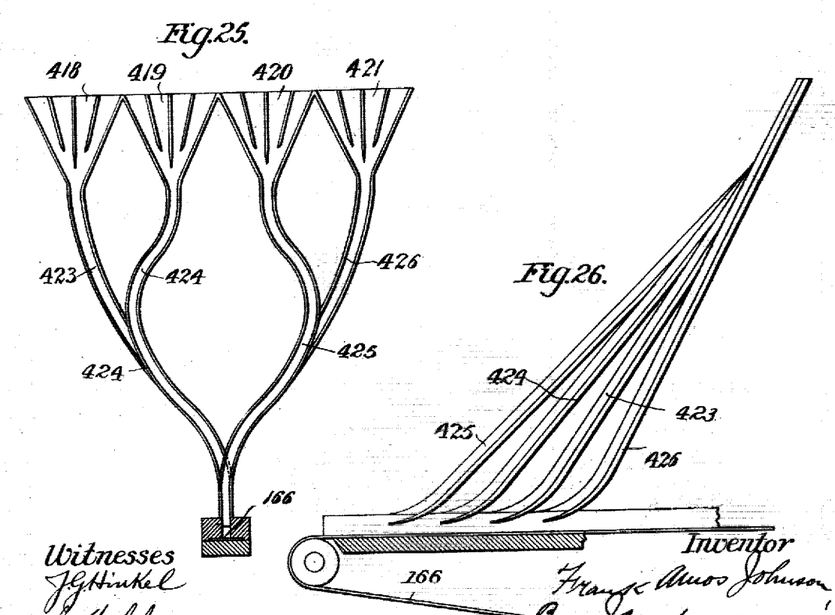

Figs. 25 and 26 illustrate an alternative form of type-apron which may be substituted for the aprons 122 124 previously described. Referring to these figures, it will be seen that instead of using a single apron for each magazine a plurality of apron sections or funnels 418, 419, 420, and 421 are used. The object of using a plurality of aprons is to equalize the time required for type to reach the belt from all parts of the magazine and also to prevent transposing or interference of successive types. The outside funnels 418 and 421 have channels 423 426, which lead quite directly to the belt 166. The intermediate funnels 419 420 have channels 424 425, which curve outward and then inward in order to give them substantially the same length and amount of curvature as the outer channels. By subdividing an apron in this manner the usual guide-ribs may, if desired, be omitted. As shown, a small number of ribs 427 are provided. The funnels and channels are provided with the usual marginal flanges to guide the type to the belt. The apron-sections and their delivery-channels are arranged at different angles and made to discharge one in the rear of the other at different points on the belt. It will be seen that the rear channel 426 is steeper than the next channel 423. This causes the type to travel faster in the rear channels than in the forward channels; but the difference in time is equalized on the belt, the type from the rear channels having farther to travel than the type from the forward channels.

Figures 27, 28, 29, 30, 31:
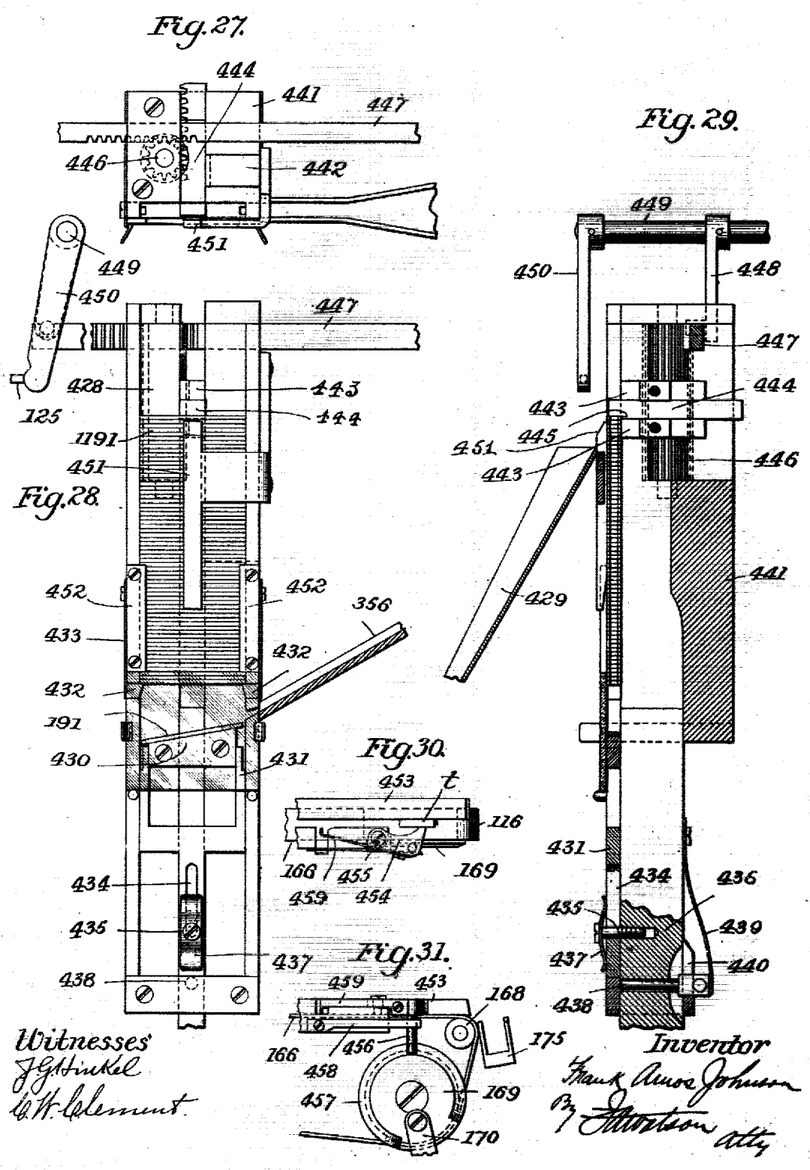

Figs. 27, 28, and 29 illustrate mechanism for returning separators to their magazines which may or may not be used, forming a modification of the construction above described. Referring to these figures, 428 indicates a separator-magazine channel, from which the separators are discharged onto an apron 429, leading to the assembling-belt. The magazine-channel 428 is vertically arranged, and the separators, which are ejected from the line in the justifying-channel, slide down the incline 356 and onto a platform 430, located beneath the magazine. An elevator-yoke 431 has prongs sliding at each end of the platform 430, adapted to engage the ends of the separators 191 and raise them into the magazine, where they are retained by detents 432, carried by springs 433. The elevator-yoke 431 has a slot 434, through which a pin 435 extends to a constantly-reciprocated elevator-slide 436. The yoke is pressed into contact with the slide by a spring 437, which engages the yoke frictionally with the slide. In the lower part of the slide 436 is a stud 438, which is pressed forward by a spring 439, and which is withdrawn, as shown in Fig. 29, by a cam 440 when the slide is in its lowest position. As the slide 436 rises, the yoke is carried up frictionally. If a separator happens to be partially on the chute 356 and partially on the platform 430, the yoke will be stopped and the pin 438, after passing off the cam 440, will rest against the lower part of the yoke. If, however, a separator is properly located on the platform 430 the yoke will carry it up to the magazine, and before reaching the magazine the pin 438 will be projected forward under the yoke to carry the yoke up positively. The separator will thus be forced into the magazine, and all of the separators in the magazine will be raised to make room for it. The separators are thus elevated into the magazine as they arrive from the justifying-channel. The magazine is located in a vertical bracket 441. In vertical guides in the upper end of this bracket is a slide 442, provided with horizontal guides 443, in which a space-ejector 444 operates. The forward end of the ejector 444 normally rests upon the uppermost separator in the magazine, as shown in Figs. 28 and 29, and the ejector is provided with a shoulder 445, which engages the uppermost separator. The ejector is in the form of a rack which has teeth engaging an elongated pinion 446, and said pinion is operated by a rack 447, arm 448, rock-shaft 449, arm 450, and one of the ejectors 125, the ejector being used to rock the arm 450 instead of ejecting the separators directly from the magazine. The rack 447 is also utilized to operate the separator-counting device by a link similar to link 262, previously described. It will be seen that the ejector 444 will follow the pile of separators downward and continue to eject separators from the top of the magazine regardless of the number of separators in the magazine, provided the top of the pile of separators is above the bottom of the gear 446. The number of separators actually in the magazine will vary within narrow limits, depending upon the number of separators which are in the line under justification. In practice it is not necessary to make the gear 446 longer than that illustrated. To prevent more than one separator being ejected at a time, a fender 451 is arranged in front of the magazine and carried by the slide 442. The upper end of the fender always stands opposite the second separator to prevent it from being dislodged. As shown, the fender extends downward over a number of separators to hold them in the magazine. The lowermost separators are retained by flanges 452.

In Figs. 30 and 31 is shown a modified form of device for regulating the delivery of type from the assembling-belt 166. Referring to these figures, 453 indicates a guide along which the type are conveyed on the belt, and 454 indicates an escapement device which is pivoted at 455 and constantly vibrated by engagement of a pin 456 with a side cam 457 on the sheave 169. The forward end of the pawl 454 is normally pressed against the guide 453 by a spring 458. On the tail end of said pawl is a type-stop 559. It will be seen that the escape-pawl 454 is vibrated in unison with the movement of the elevator-slide 171. The cam 557 is so timed that the forward end of the pawl will be moved to release the type at the proper moment to have it pass fully onto the elevator 175 before the trigger-lever 182 crosses its path. As one type is released the next-following type is detained by the stop 459. The stop-pawl 454 is thus used for timing the arrival of the type at the elevator. While it is preferred to use the trigger to release the elevator, it will be seen that the elevator might be constantly reciprocated and the trigger dispensed with, as the type may be delivered to the elevator by the pawl 454 and the belt at the moment the elevator is at its lowest position.

It will be evident that the devices illustrated in Figs. 27, 28, and 29 for inserting separators in a magazine-channel and for ejecting the separators from said channel regardless of the amount therein may be used as well to load type or ordinary spaces or quads into a channel and eject the same. The claims on this feature are therefore not limited to the handling of separators.

It will be evident that many changes in details of construction may be made without departing from the spirit and scope of the foregoing invention, and for this reason the invention is not limited to the particular construction and arrangement of parts illustrated and described.

While the machine shown as embodying the invention is adapted for setting ordinary type, and I have aimed especially at the production of a machine capable of setting and justifying such type at high speed with accuracy and with a minimum of wear on the type, it will be understood that the invention is not limited to machines for handling such ordinary type, but may be applied also in handling type, matrices, or the like, of any suitable material, and the word "type" is used herein in this broad sense.

Having described my invention, what I claim, and desire to secure by Letters Patent, is—

1. In a type-setting machine, the combination of a magazine, a plurality of type-aprons, and a common assembling-belt, said type-aprons having converging guides and delivery-channels which discharge the type onto said belt.

2. In a type-setting machine, the combination with a magazine, of a plurality of type-aprons, each apron being provided with converging guides, and type-channels leading from said aprons and discharging one in rear of the other upon a common assembling-belt or guide, whereby interference of type in the channels is prevented.

3. In a type-setting machine, the combination with the magazine, the ejectors, the common ejector-bar, and the escape-shaft for reciprocating said bar, of the lift-rods beneath the ejectors, the seat upon which said rods rest when raised, means for throwing said rods off of said seat, the keyboard, and the connections between the key-levers and the lift-rods.

4. In a type-setting machine, the combination with a magazine, and means for delivering type from the magazine to an assembling-channel, of the vertically-arranged assembling-channel to which the type are delivered, means for elevating the type successively into said channel to form a line therein, and a trigger controlling the elevator, said trigger being operated by the type arriving at the assembling-channel.

5. In a type-setting machine, the combination with a magazine, a vertically-arranged assembling-channel, and means for discharging type from the magazine and conveying them to the lower end of said channel, of a yielding resistant in said channel, an elevator for raising type from the assembling-point into the channel to form a line therein, a trigger-lever, means for vibrating the same across the path of the arriving type, and means for raising the elevator when the trigger is intercepted by a type.

6. In a type-setting machine, the combination of a vertically-arranged assembling-channel, a type-elevator for assembling type in said channel, a transfer-channel above the assembling-channel, a line-elevator operating to shift the line from the assembling-channel to the transfer-channel, a resistant arranged to travel on top of the line as it is being assembled to confine the type, and means for automatically withdrawing the resistant from the line when the latter is elevated and for restoring the resistant in the path of the next succeeding line.

7. In a type-setting machine, the combination with the vertically-arranged assembling-channel, and means for inserting type at the bottom of said channel to form a line therein, of a slide arranged parallel with the channel, a lever pivoted to the slide and extending into the assembling-channel, a latch pivoted to the slide and operating to hold the lever in said channel, a line-elevator, and means for releasing the lever when the elevator is operated to permit the line to pass out of the assembling-channel.

8. In a type-setting machine, the combination of a vertically-arranged assembling-channel, a type-elevator at the bottom of said channel, a retaining-pawl for sustaining the elevated type, a constantly-reciprocating pawl normally disconnected from the elevator, and a trigger for bringing said pawl into engagement with the elevator when a type is in position to be elevated.

9. In a type-setting machine, the combination with the vertically-arranged assembling-channel, the line-elevator slide arranged parallel with said channel, the lever connected with said slide and normally out of the assembling-channel, means tending constantly to raise the elevator-slide, a starting-key, and means connected therewith for releasing the elevator-slide and throwing the elevator-lever into the assembling-channel below the type therein.

10. The type-justifying mechanism comprising a laterally-movable line-transfer channel, a space-mold, a device for measuring the line in said channel, a space-counting device operated by the space-ejecting devices, and mechanism controlled by the line-measuring and space-counting devices for adjusting the mold to cast justifying-spaces.

11. In a type-justifying machine, the combination of a space-mold, a series of dividing-levers having fulcrums at different points respectively, means controlled by the number of spaces in a line for selecting the proper lever, means for moving the selected lever in proportion to the shortage of a line, and connections between the levers and the mold for adjusting the latter.

12. The combination in a typographic machine, of a mold movable from a casting position to an ejecting position, means for ejecting a type-body partially from a mold and moving the mold while the type-body is partially ejected, a knife arranged to partially sever the jet while the mold is moving, means for finally ejecting the type from the mold, and means for breaking the jet.

13. In a typographic machine, the combination with a space-casting mechanism, means for operating said mechanism to cast the spaces for a line successively, and a justifying-channel, of a runway extending from the casting mechanism to the channel, and means for adjusting the mold and the runway to approximately the same widths whereby the spaces are prevented from turning in the runway.

14. In a typographic machine, a vertically-arranged magazine, means for feeding the type or spaces into the magazine at the lower end thereof, means independent of the feeding means for sustaining the type or spaces in the magazine and automatically-adjustable means for ejecting the type or spaces from the upper end of a type or space line of varying length in the magazine.

15. In a typographic machine, the combination with a magazine-tube, of an ejector movable longitudinally of the tube to register with the end type or space therein and movable laterally to eject the end type or space.

16. In a typographic machine, the combination with a magazine-channel, of a slide movable longitudinally of said channel, an ejector mounted on the slide and movable transversely to said channel, and a fender carried by said slide, the ejector being arranged to eject the end type or space in the channel and the fender being arranged to retain the remaining type or spaces within the channel.

17. In a typographic machine, a vertically-arranged magazine-channel, in combination with a slide movable longitudinally of the channel, a reciprocating ejector carried by said slide, said slide being sustained upon the column of type or spaces in said channel and said ejector being adapted to dislodge the uppermost type or space in the channel.

18. In a typographic machine, the combination of a vertically-arranged magazine-channel, a slide movable longitudinally of the channel, an ejector carried by the slide, said ejector normally resting upon the type or spaces in the channel and having a shoulder adapted to dislodge the uppermost type or space therein.

19. In a typographic machine, a vertically-arranged magazine-channel, in combination with an elevator arranged to inject type or spaces into the lower end of the channel, movable devices for sustaining the type or spaces in said channel, and an ejector normally resting upon the type or spaces in the channel and adapted to discharge the uppermost type or space therein.

20. In a typographic machine, the combination with a vertically-arranged magazine, of a table or support beneath said magazine, an elevator adapted to raise type or spaces from said table or support into the magazine, means for operating said elevator yieldingly during the first part of its upward movement, and means for operating said elevator positively during the latter part of its upward movement, for the purpose set forth.

21. In a typographic machine, the combination with a vertically-arranged magazine-channel, of an elongated pinion parallel with the channel, an ejector operated transversely to the channel by said pinion, and means for maintaining said ejector in register with the uppermost type or space in the channel.

22. In a typographic machine, the combination with an assembling-channel and an elevator, of an assembling-belt, a vibrating detent arranged to intercept type upon said belt and operated to release the type at regular intervals.

23. In a typographic machine, the combination with an assembling-channel, a belt conveying type thereto, and an elevator for forcing the type into the channel intermittently, of a detent operating to detain the type on the assembling-belt, and means for periodically vibrating the detent to release the type at regular intervals.

In testimony whereof I affix my signature in presence of two witnesses.

FRANK AMOS JOHNSON.

Witnesses:
 JOHN F. NELSON.
 W. E. BRAND.